(12) United States Patent
Opedal

(10) Patent No.: US 12,314,956 B2
(45) Date of Patent: May 27, 2025

(54) DYNAMIC MACHINE LEARNING MODELS FOR DETECTING FRAUD

(71) Applicant: T-Mobile USA, Inc., Bellevue, WA (US)

(72) Inventor: Jan Olav Opedal, Ellensburg, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 93 days.

(21) Appl. No.: 18/309,739

(22) Filed: Apr. 28, 2023

(65) Prior Publication Data

US 2024/0362640 A1    Oct. 31, 2024

(51) Int. Cl.
*G06Q 20/40*    (2012.01)
*G06N 20/00*    (2019.01)

(52) U.S. Cl.
CPC ......... *G06Q 20/4016* (2013.01); *G06N 20/00* (2019.01)

(58) Field of Classification Search
CPC .......................... G06Q 20/4016; G06N 20/00
See application file for complete search history.

(56) References Cited

U.S. PATENT DOCUMENTS

| | | | |
|---|---|---|---|
| 7,263,506 B2 | 8/2007 | Lee et al. | |
| 7,440,915 B1 | 10/2008 | Ulrich | |
| 8,458,069 B2 | 6/2013 | Adjaoute | |
| 10,089,683 B2 | 10/2018 | Dominguez | |
| 10,460,320 B1 | 10/2019 | Cao et al. | |
| 10,692,058 B2 | 6/2020 | Zoldi et al. | |
| 10,796,312 B2 | 10/2020 | Bull | |
| 10,867,303 B1 | 12/2020 | Manapat et al. | |
| 10,872,341 B1 | 12/2020 | Beckman et al. | |
| 11,037,229 B2 | 6/2021 | Zoldi et al. | |
| 11,074,586 B2 | 7/2021 | Vandezande et al. | |
| 11,127,015 B2 | 9/2021 | Vandezande et al. | |
| 11,151,569 B2 | 10/2021 | Allbright et al. | |
| 11,157,913 B2 | 10/2021 | Allbright et al. | |
| 11,244,321 B2 | 2/2022 | Wu et al. | |
| 11,379,842 B2 | 7/2022 | Venturelli et al. | |
| 11,379,855 B1 | 7/2022 | Anderson et al. | |
| 11,488,170 B1 | 11/2022 | Mattei et al. | |
| 11,501,303 B2 | 11/2022 | Johnson et al. | |
| 11,521,211 B2 | 12/2022 | Allbright et al. | |
| 11,544,713 B1 * | 1/2023 | Hansen .................. | G06N 20/00 |
| 11,704,673 B1 | 7/2023 | Drapeau et al. | |
| 11,741,474 B2 | 8/2023 | Allbright et al. | |
| 11,748,757 B1 | 9/2023 | Segal et al. | |
| 11,842,351 B2 | 12/2023 | Benkreira et al. | |

(Continued)

FOREIGN PATENT DOCUMENTS

| | | |
|---|---|---|
| CN | 112348519 A | 2/2021 |
| CN | 110633987 B | 6/2023 |

(Continued)

*Primary Examiner* — Scott S Trotter
(74) *Attorney, Agent, or Firm* — Perkins Coie LLP

(57) ABSTRACT

A fraud detection system to proactively identify fraudulent transactions. The system receives an analyst-generated report for a transaction and trains a model using features from the feature types identified in analyst-generated reports. The system generates a fraud likelihood score for each requested transaction, compares it to the analyst-generate assessment, and retrains the model based on the difference.

20 Claims, 6 Drawing Sheets

(56) References Cited

U.S. PATENT DOCUMENTS

| | | |
|---|---|---|
| 11,875,353 B2 | 1/2024 | Abadi et al. |
| 11,900,336 B2 | 2/2024 | Rosenthal |
| 11,922,422 B2 | 3/2024 | Gelda et al. |
| 2010/0145836 A1 | 6/2010 | Baker et al. |
| 2011/0225076 A1 | 9/2011 | Wang et al. |
| 2014/0108251 A1 | 4/2014 | Anderson et al. |
| 2016/0063501 A1 | 3/2016 | Kalyan et al. |
| 2019/0295089 A1 | 9/2019 | Jia et al. |
| 2020/0005310 A1 | 1/2020 | Kumar et al. |
| 2020/0137050 A1 | 4/2020 | Reddimasi et al. |
| 2021/0304206 A1 | 9/2021 | Juneja et al. |
| 2021/0312451 A1 | 10/2021 | Allbright et al. |
| 2022/0051255 A1 | 2/2022 | Abifaker et al. |
| 2022/0101192 A1 | 3/2022 | Patel |
| 2022/0191219 A1 | 6/2022 | Wright et al. |
| 2022/0253856 A1 | 8/2022 | Wong et al. |
| 2022/0300903 A1 | 9/2022 | Huang et al. |
| 2022/0383323 A1 | 12/2022 | Burke et al. |
| 2023/0062124 A1 | 3/2023 | Sossin et al. |
| 2023/0107703 A1 | 4/2023 | Zhang et al. |
| 2023/0111445 A1 | 4/2023 | Ranjan et al. |
| 2023/0186308 A1 | 6/2023 | Babu |
| 2023/0273981 A1 | 8/2023 | Rapowitz et al. |
| 2023/0316284 A1 | 10/2023 | Kramme et al. |
| 2023/0360049 A1 | 11/2023 | Ammatanda et al. |
| 2024/0037559 A1 | 2/2024 | Mehta et al. |
| 2024/0104568 A1 | 3/2024 | Oest et al. |

FOREIGN PATENT DOCUMENTS

| | | |
|---|---|---|
| CN | 110956547 B | 11/2023 |
| EP | 3416123 A1 | 12/2018 |
| KR | 102412432 B1 | 6/2022 |
| KR | 102499182 B1 | 2/2023 |
| WO | 0227610 A1 | 4/2002 |

* cited by examiner

DYNAMIC MACHINE LEARNING MODELS FOR DETECTING FRAUD

BACKGROUND

Natural language processing (NLP) is an interdisciplinary subfield of linguistics, computer science, and artificial intelligence concerned with the interactions between computers and human language, in particular how to program computers to process and analyze large amounts of natural language data. The goal is a computer capable of "understanding" the contents of documents, including the contextual nuances of the language within them. The technology can then accurately extract information and insights contained in the documents as well as categorize and organize the documents themselves.

One application of NLP is sentiment analysis (also known as opinion mining or emotion AI). Sentiment analysis is the use of natural language processing, text analysis, computational linguistics, and biometrics to systematically identify, extract, quantify, and study affective states and subjective information. Sentiment analysis is widely applied to voice of the customer materials such as reviews and survey responses, online and social media, and healthcare materials for applications that range from marketing to customer service to clinical medicine.

One common problem is topic analysis. Topic analysis consists of two main tasks: topic identification and text segmentation. While the first is a simple classification of a specific text, the latter case implies that a document may contain multiple topics, and the task of computerized text segmentation may be to discover these topics automatically and segment the text accordingly. The topic boundaries may be apparent from section titles and paragraphs. In other cases, one needs to use techniques similar to those used in document classification. Segmenting the text into topics or discourse turns might be useful in some natural processing tasks: it can improve information retrieval or speech recognition significantly (by indexing/recognizing documents more precisely or by giving the specific part of a document corresponding to the query as a result). It is also needed in topic detection and tracking systems and text summarizing problems.

BRIEF DESCRIPTION OF THE DRAWINGS

Detailed descriptions of implementations of the present invention will be described and explained through the use of the accompanying drawings.

Figure 1:
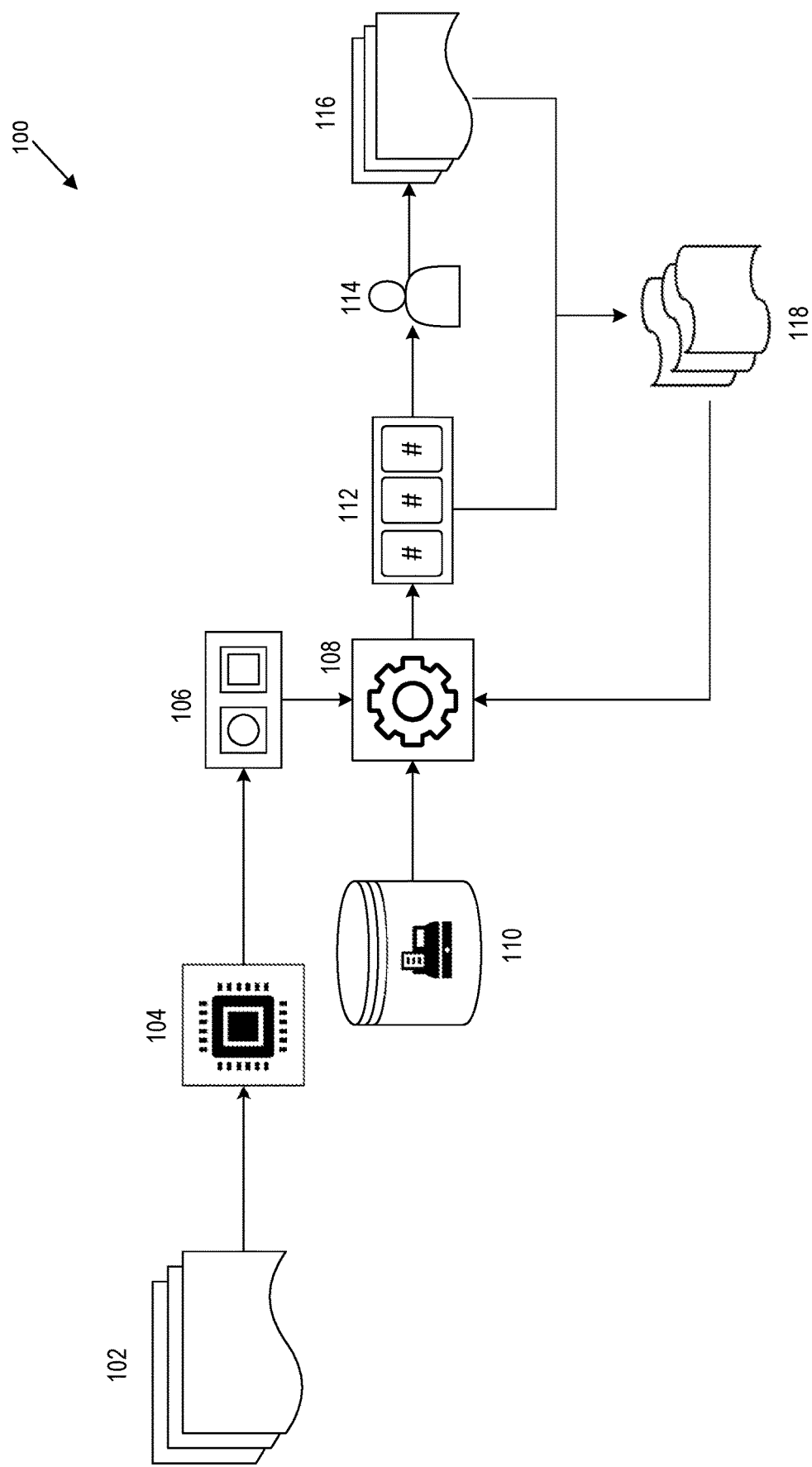
FIG. 1 illustrates a system environment which proactively identifies fraudulent transactions, according to some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Systems that exist to detect fraud rely heavily on analyst reviews to identify and confirm fraudulent transactions. For example, existing systems require a manual review for each transaction to mitigate fulfillment of fraudulent transactions. However, there is a limited window, in many cases less than two hours, for an analyst to identify and confirm fraudulent transactions before the transaction is completed. There are several challenges with implementing the system such as what to focus on in transactions to identify fraudulent transactions as well as being able to keep up to date with new methods of fraud and fraud detection techniques over time.

Fraud detection models can be used to automate at least some of the analysis of transactions. A fraud detection model can monitor ongoing or past transactions to generate predictions as to whether certain transactions are fraudulent. When the model predicts a transaction to be fraudulent, information about the transaction can be passed to an analyst for further review. However, while fraud detection models can help analysts focus their review on the transactions that are most likely to be fraudulent, existing models do not account for fraudsters' changing tactics. Thus, many fraud detection models incorrectly categorize transactions, resulting in false positives being pushed to analysts that waste analyst resources and false negatives being allowed to proceed and causing harm to a customer or an enterprise. Additionally, conventional fraud detection techniques are not able to link data from multiple sources, and thus make fraud determinations on incomplete profiles.

To solve these challenges, the present disclosure provides a dynamic solution to identifying features based on historical transactions to generate a fraud detection model that proactively identifies fraudulent transactions. To improve the model, natural language processing is applied to analyst-generated reports to extract types of features that are used to train the fraud detection model. The model is retrained over time based on a difference between the fraud prediction scores output by the model and the assessment by analysts. Accordingly, implementations of the present disclosure improve fraud detection by a dynamic model that responds to changing fraudulent behaviors, in a manner not achieved by current fraud detection techniques.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

System Environment to Proactively Identify Fraudulent Transactions

FIG. 1 illustrates system environment 100 which proactively identifies fraudulent transactions, according to some implementations. A transaction may be considered fraudulent if it involves an act of deception by one or more entities associated with the transaction. For example, fraudulent transactions detectable in the environment 100 include transactions in which one person impersonates another person, transactions in which a person uses a stolen or invalid credit card, or transactions in which a person uses deception to coerce another person to perform the transaction. In general, the system environment 100 uses fraud assessment reports to train and update a fraud detection model that dynamically responds to changes in fraudulent behaviors, thereby increasing the fraud detection model's ability to accurately detect fraud and reducing burden on analysts.

As shown in FIG. 1, system environment 100 includes a natural language process (NLP) model 104 and fraud detection system 108. The NLP model 104 receives analyst reports (e.g., analyst reports 102) that include evaluations corresponding to historical transactions. For example, analyst reports may include historical transactions and corresponding analyst reports in natural language regarding whether historical transactions were fraudulent. NLP model 104 extracts feature types (e.g., feature types 106) using NLP and the analyst reports. The fraud detection system 108 is trained based at least in part on the extracted feature types (e.g., feature types 106).

In some implementations, the system may identify feature types. As disclosed herein, feature types may include high-level categories used to categorize features (e.g., feature types 106). In some implementations, the system may identify features as a subset of the feature type. As disclosed herein, features may include data that is used to train a model and that falls under the broader feature type. For example, a feature type may be text length counts which include features such as word length. As another example, a feature type may be named entity recognition which may include features such as person names, organizations, locations, quantities, monetary values, etc. As another example, a feature type may be sentiments and emotions referring to sentiment analysis. Features falling under the sentiments and emotions category may include negative, neutral, or positive.

In some implementations, the system may rely on analyst reports corresponding to historical transactions. As disclosed herein, historical transactions may include past financial transactions that have occurred between one or more parties. For example, historical transactions may include an agreement between a buyer and seller to exchange goods, services, or financial assets in return for money that occurred in the past. The specific period of time in the past may be application dependent. For example, to detect fraudulent purchases, a reasonable time for historical transactions may be transactions that occurred more than 2 hours in the past. Historical transactions may be used in system environment 100 to use as input to an NLP model for feature extraction.

The fraud detection system 108 receives transaction data associated with requested transactions 110. Requested transactions 110 may include recent transactions (e.g., transactions that have occurred within the last two hours). Based on analysis of the transaction data, fraud detection system 108 outputs fraud likelihood score 112. Fraud likelihood score 112 indicates the likelihood that a requested transaction is indeed fraudulent. An analyst (e.g., analyst 114) may receive fraud likelihood score 112 and generate an assessment (e.g., analyst-generated assessment 116). The system may take the difference between the fraud likelihood score and the analyst-generated assessment (e.g., difference 118) and use it to retrain fraud detection system 108.

In some implementations, the system may train and use fraud detection system 108 to proactively identify fraudulent transactions out of requested transactions 110. As disclosed herein, requested transactions may include financial transactions that have occurred between one or more parties recently and that require additional analysis to determine if they are fraudulent. The specific period of time may be application dependent. For example, to detect fraudulent purchases a reasonable time for requested transactions may be within 2 hours.

Analyst Perspective of a Graphical User Interface

Figure 2:
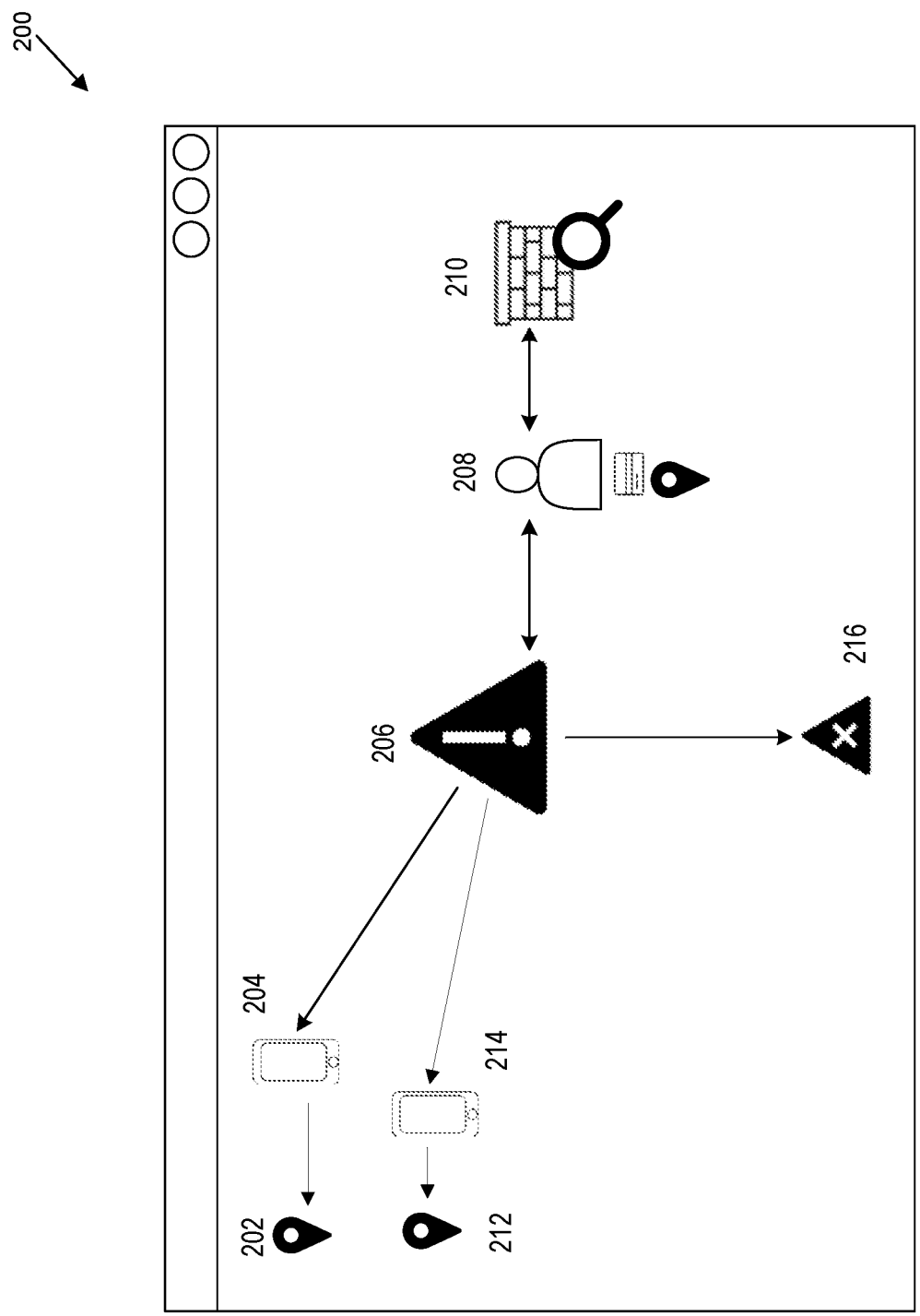
FIG. 2 is an example graphical user interface used for proactively identifying fraudulent transactions.

FIG. 2 is an analyst perspective of a graphical user interface (GUI) 200 for a system to proactively identify fraudulent transactions. Providing a GUI may allow analysts to quickly identify if a requested transaction (e.g., requested transaction 206) is deemed likely fraudulent by the system based on the determination of the system and the corresponding fraud likelihood score (e.g., fraud determination 216). Based on the GUI the analyst may clearly identify the components that went into the model's decisions or provide context for the fraud likelihood score (e.g., the fraud likelihood score associated with fraud determination 216). Understanding the context and components that the model used to generate the fraud likelihood score may help inform the analyst-generated assessment regarding the requested transaction (e.g., requested transaction 206).

In some implementations, GUI 200 includes information that may provide additional information for an analyst. For example, 200 may include one or more shipping addresses (e.g., shipping address 202 or shipping address 212). The shipping address may be used to identify fraudulent transactions. For example, if the shipping address is new it could be cause for concern more than a shipping address that was used successfully in the past. If the shipping address is an unoccupied residence, it may indicate fraudulent activity.

In some implementations, a purchaser may be associated with an order (e.g., purchaser 208). The purchaser may include details about a buyer such as a name, billing information, and payment information. The haversine formula may be used to identify unrealistic distances between addresses of different orders. For example, if an order from a purchaser (e.g., purchaser 208) is placed in location A at time 1 and another order is placed from location B at time 2, the haversine formula may be used to compute the distance and if the distance between location A and location B is not feasibly traveled from time 1 to time 2 then the requested transaction may be fraudulent.

Product information may also be used to identify fraudulent transactions. For example, product 204 or product 214 may include a large quantity order of a specific product not typically purchased in large quantities which may be suspicious.

The system may be able to access a database of blacklisted purchasers, addresses, or financial information. The GUI may represent the results of the blacklist check in blacklist check 210. If any of the data contained in the blacklist is present in the requested transaction, it could indicate that the transaction is fraudulent.

An analyst interacts with the GUI 200 to prepare a fraud assessment report. When preparing the report, the analyst may identify particular information types displayed in the GUI as being relevant to or irrelevant to the analyst's assessment. For example, a report may indicate that an analyst has determined that a particular transaction is likely to be fraudulent based on an output of the haversine formula and a product type. In some implementations, the analyst operates controls in the GUI to label data items. Such labels can include, for example, a classification of the data item as relevant or not relevant or as indicative of fraud or not indicative of fraud, or a score assigned to the data item. The system can in turn generate an analyst report that identifies the labels assigned to each data item based on the analyst's interactions with the GUI controls. In other implementations, an analyst generates a report independently of the analyst's interactions with the data in the GUI (e.g., by composing a memo to explain why a transaction was determined to be fraudulent or not fraudulent).

Based on the information comprised in the GUI as well as additional information outside the GUI, the system can make a fraud determination (e.g., fraud determination 216) which includes a fraud likelihood score. In some implementations, the system may be balanced to reduce false positives as they can be disruptive and frustrating to a purchaser, and maximize true positives to mitigate fraudulent purchases before they are fulfilled.

Model to Proactively Identify Fraudulent Transactions

Figure 3:
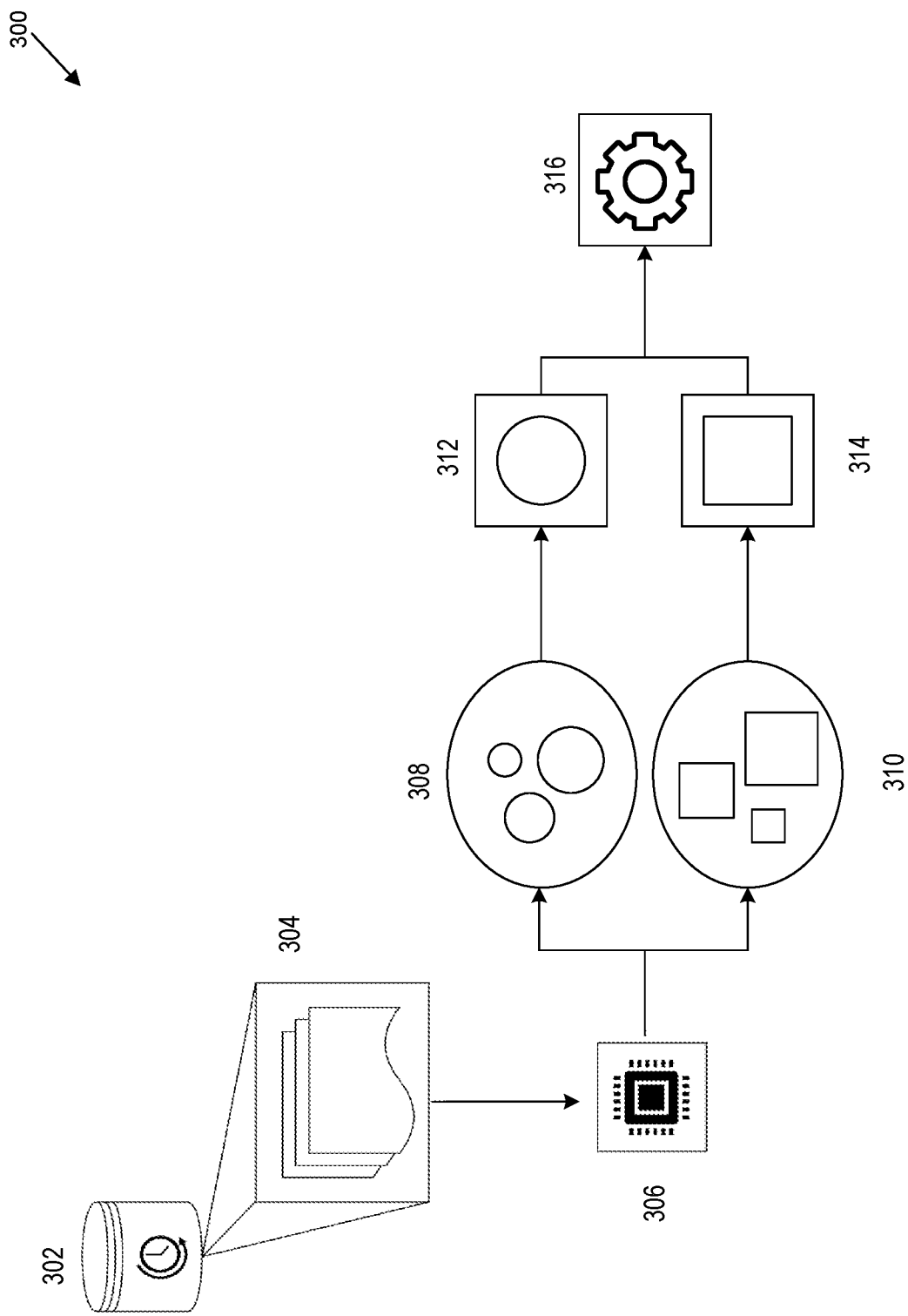
FIG. 3 illustrates training a model to proactively identify fraudulent transactions, according to some implementations.

FIG. 3 illustrates a system 300 for training a model to proactively identify fraudulent transactions, according to some implementations. For example, system 300 includes NLP model 306 that takes historical transactions (e.g., historical transactions 302) and analyst-generated reports (e.g., analyst-generated reports 304) as input. NLP model 306 can extract features (e.g., feature 312 and feature 314) that correspond to feature types (e.g., feature type 308 and feature type 310) to train a fraud detection model (e.g., fraud detection model 316).

In some implementations, analyst-generated reports 304 describe, in natural language, evaluations by analysts regarding whether corresponding historical transactions were fraudulent. For example, analyst-generated reports 304 include one or more analyst-generated reports that each corresponds to at least one historical transaction in a database of historical transactions (e.g., historical transactions 302), in which an analyst identified items of data associated with the historical transaction and explained why those items of data led the analyst to conclude that the transaction was fraudulent or not fraudulent.

In some implementations, NLP model 306 processes the set of analyst-generated reports using natural language processing to identify one or more feature types (e.g., feature type 308 and feature type 310) relevant to the evaluations. In some implementations, the system may identify feature 312 and feature 314 as a subset of feature type 308 and feature type 310 respectively.

In some implementations, the system can use topic modeling to identify the feature types relevant to the evaluation. For example, the system can determine an extracted topic set as a result of performing topic modeling on the evaluation. The extract topic set can comprise a cluster of words that frequently co-occur together (e.g., "large order quantity") in analyst-generated reports of fraudulent transactions.

In some implementations, the NLP may identify feature types by determining an extracted tone using tone analysis. Alternatively, the NLP model can use entity extraction on the evaluation to determine an extracted entity. In some implementations, the NLP model can determine one or more extracted entities.

Feature types may be determined by assessing the specific domain and identifying feature categories of the specific application. Feature types may be determined by data analysis methods. For example, in a fraud detection application, data analysis may include using an NLP model to identify reoccurring words appearing in analyst reports for transactions that are fraudulent.

For example, feature types identified by assessing a specific domain or using an NLP model associated with a fraud detection model may include transaction details, customer information, and payment information which can be identified based on the type of application. Features corresponding to the transaction details feature type, customer information feature type, and payment information feature type may include an amount, frequency, location, time, payment method, product purchased, and addresses.

In some implementations, fraud detection model 316 is trained using features (e.g., feature 312 and feature 314) from a data stream related to the plurality of historical transactions (e.g., analyst-generated reports 304 and historical transactions 302), that correspond to the one or more feature types (e.g., feature type 308 and feature type 310). By training NLP model 306 using the data stream related to the historical transactions the NLP model can identify features in the reports corresponding to historical transactions that may identify features that are similar to the historical transaction thereby indicating a similar transaction to the historical transaction is similarly fraudulent or not fraudulent.

Computing Device Components

Figure 4:
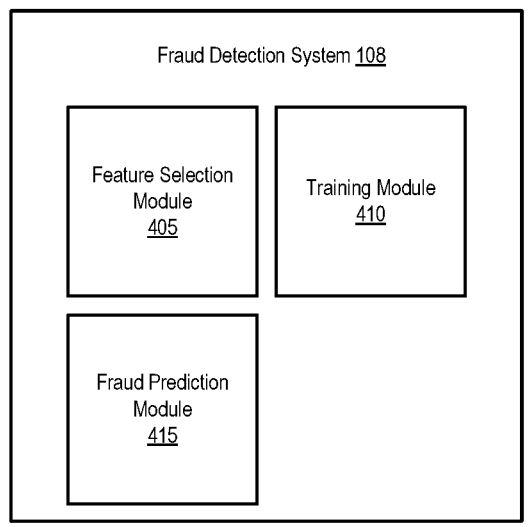
FIG. 4 is a block diagram illustrating components of a fraud detection system, according to some implementations.

FIG. 4 is a block diagram illustrating components of fraud detection system 108, according to some implementations. As shown in FIG. 4, an example implementation of the fraud detection system includes feature-selection module 405, training module 410, and fraud-prediction module 415.

Fraud detection system 108 can include additional, fewer, or different modules. Furthermore, the functionality described herein can be divided differently between the modules. As used herein, the term "module" refers broadly to software components, firmware components, and/or hardware components. Accordingly, feature-selection module 405, training module 410, and fraud-prediction module 415 could each be comprised of software, firmware, and/or hardware components implemented in, or accessible to fraud detection system 108. Together, the modules shown in FIG. 4 enable dynamic training of fraud detection system 108 and proactive identification of fraudulent transactions.

Feature-selection module 405 extracts feature types from historical analyst-generated reports to derive features corresponding to transactions in the future. In some implementations, historical analyst-generated reports are in natural language. For example, analyst-generated reports pertaining to historical transactions may include information such as key indicators of fraudulent activity which may include the purchaser, the product, or addresses.

At least a portion of the analyst-generated report associated with a historical transaction can be analyzed with a natural language processing model that identifies feature types from the natural language analyst-generated report. The natural language processing model can include statistical models, neural network-based models, and/or rule-based models, that perform functions such as part-of-speech tagging, lexical semantics, or relational semantics.

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the natural language processing model can be a neural network with multiple input nodes that receive data derived from the analyst-generated reports. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used to identify the components, semantics, tone, or other language attributes used to determine a transaction was fraudulent. In some implementations, such neural networks, known as deep neural networks, can have multiple layers of intermediate nodes with different configurations, and can be a combination of models that receive different parts of the input and/or input from other parts of the deep neural network, or are convolutions-partially using output from previous iterations of applying the model as further input to produce results for the current input.

In an example implementation, the natural language processing model identifies one or more feature types (e.g., entity recognition, sentiments, or emotions) within the analyst-generated report. For example, the natural language processing model includes one or more neural networks that are trained using analyst-generated reports as input and feature types as output. The trained neural network is configured to receive an analyst-generated report associated with a historical transaction and generate or identify one or more feature types by application of the trained NLP model to the analyst generated-report.

Training module 410 uses the extracted feature types from analyst-generated reports of historical transactions to train a fraud detection model. In some implementations, historical analyst reports are in natural language. For example, analyst reports pertaining to historical transactions may include information such as key indicators of fraudulent activity which may include the purchaser, the product, or a discrepancy in shipping addresses.

The system may use a data stream related to historical transactions to train a machine learning model. In some implementations, a data stream related to historical transactions may include the data associated with an analyst-generated report that the analyst may use to identify fraudulent transactions. For example, a data stream related to historical transactions may include data corresponding to a purchaser such as identifiers, addresses, or payment information. In some implementations, the data stream related to historical transactions may also include features that can be extracted to train the machine learning model.

The output of training module 410 can include a trained machine learning model designed to take as input a requested transaction as input and output a fraud likelihood score indicating the likelihood that the requested transaction is fraudulent. The fraud likelihood score may be determined based on extracted features (e.g., person names, organizations, locations, quantities, monetary values, negative tone, neutral tone, or positive tone) of the requested transaction that correspond to feature types from the analyst-generated reports.

Fraud-prediction module 415 receives as input data associated with requested transactions. In some implementations, the input data includes transaction data such as purchaser information, billing address, shipping address, payment information, previous transactions associated with the purchaser, product type purchased, quantity, or other information pertaining to a purchase. For example, a requested transaction may include key indicators of fraudulent activity such as the purchaser, the product type, an abnormal product quantity, or a discrepancy in shipping addresses.

The output of fraud-prediction module 415 may include a fraud likelihood score which indicates the likelihood that a requested transaction is fraudulent. Depending on the fraud likelihood score, the requested transaction may be transmitted to an analyst to evaluate the requested transaction. For example, if a requested transaction is suspected to be fraudulent, as indicated by a fraud likelihood score that exceeds a threshold value, fraud-prediction module 415 may escalate the transaction to an analyst for additional review. As another example, upon receiving a requested transaction and corresponding fraud likelihood score the analyst may create an analyst-generated assessment that may include a key determination indicating if the requested transaction is or is not fraudulent and may include a description detailing why a requested transaction is or is not fraudulent. Fraud-prediction module 415 may retrain itself based on the difference between the fraud likelihood score and the analyst-generated assessment to improve the accuracy of fraud likelihood metrics in the future.

Illustrative Flowchart

Figure 5:
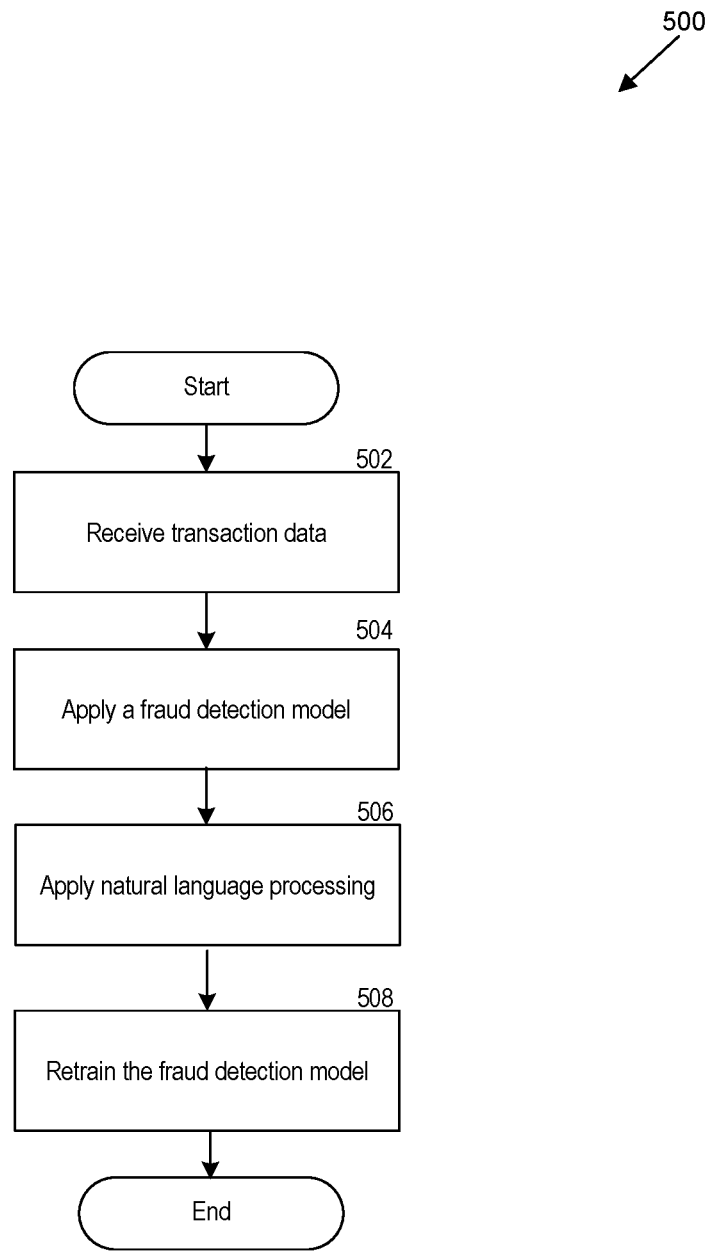
FIG. 5 is a flowchart illustrating a process for proactively identifying fraudulent transactions, according to some implementations.

FIG. 5 is a flowchart illustrating a process for proactively identifying fraudulent transactions, according to some implementations. For example, the system uses process 500 to identify fraudulent transactions proactively based on transaction data, thereby increasing the likelihood that fraudulent activities can be mitigated before the consequences of the fraudulent activities are realized.

At 502 the fraud detection system receives multiple requested transactions associated with an enterprise. For example, the system receives, by the fraud detection system, transaction data describing a plurality of requested transactions associated with an enterprise for each requested transaction. The system may receive transaction data describing multiple online purchases associated with a single retailer that are suspected to be fraudulent. As another example, the system receives transaction data describing multiple online purchases associated with a single retailer that are high-cost purchases. By receiving multiple requested transactions, the system identifies fraudulent activity for the enterprise before there are any consequences for the enterprise.

In some implementations, the system includes a requested transaction such that the requested transaction is still processing and can be canceled. For example, the system may, wherein the requested transaction includes a transaction that is still processing, and wherein the transaction that is still processing can be canceled based on the second assessment. For example, if the requested transaction includes an order that was recently placed the system may be able to perform fraud detection on the order because it has not yet been fulfilled. By ensuring that the transaction is still processing and can still be canceled the system can perform protection in near real-time.

In some implementations, the system receives customer account data which includes metadata corresponding to a customer. The system may receive the data associated with the requested transaction which includes receiving customer account data. In some implementations, the customer account data comprises metadata corresponding to a customer. The system may receive a transaction data stream that includes metadata corresponding to the requested transaction. For example, the system can receive customer account data including metadata such as the number of transactions, the number of times addresses have been changed, the number of different payment types used, and other data related to a customer's account. By receiving customer accounts including metadata the system can identify customers associated with potentially fraudulent transactions, thereby, reducing the likelihood of the same customer making a fraudulent transaction in the future.

At 504 the fraud detection system applies a fraud detection model to the transaction data corresponding to the requested transaction. For example, the system may apply, by the fraud detection system, a fraud detection model to the received transaction data corresponding to the requested transaction. The fraud detection model may be trained using features from a data stream related to a first training set of transactions. In some implementations, the features correspond to a first set of feature types that were identified based on natural language analyst-generated reports regarding whether the transactions in the training set were fraudulent. The fraud detection model, when applied to the received transaction data, may be configured to output a first assessment regarding whether the requested transaction is fraudulent. The model may output a classification or a score. The fraud detection system may receive, from an analyst, a report containing a second assessment regarding whether the requested transaction is fraudulent. For example, the system may apply the fraud detection model to transaction data corresponding to requested transactions from an online retailer. The fraud detection model may output an assessment regarding whether a requested transaction is fraudulent based on the features extracted from training data including an analyst-generated report on other transactions. The fraud detection model may receive a second assessment from an analyst which includes an assessment of if the requested transaction is fraudulent or not. By applying a fraud detection model to the requested transaction, the system may identify a fraudulent transaction prior to fulfillment, thereby reducing negative consequences.

At 506, the fraud detection system applies natural language processing to the reports. For example, the fraud detection system applies, by the fraud detection system, natural language processing to the reports to identify a second set of feature types. For example, the fraud detection system may apply a natural language processing system to the reports corresponding to the transactions of an online enterprise. The fraud detection system may identify a set of feature types corresponding to specific transactions such as transaction details, customer information, and payment information. By applying NLP to the reports, the system may identify feature types that can be used to determine if requested transactions are fraudulent in near real time.

At 508, the fraud detection system retrains the fraud detection model. For example, the fraud detection system retrains the fraud detection model using features, corresponding to the second set of feature types, from a data stream related to a second training set of transactions. For example, the system may retrain the fraud detection model based on the second set of feature types related to the second training set after a new technique for committing fraud is discovered. In some implementations, the second training set could be entirely new transactions. As another example, the second training set could be synthetic data. In some implementations, the second training set can include at least some of the first training set. In some implementations, the model is retrained based on transaction data that is within a threshold recency. By retraining the fraud detection model, the system may proactively identify fraudulent transactions and dynamically adjust to fraudsters' changing tactics.

In some implementations, the system applies the retrained fraud detection model to the data associated with a second requested transaction. For example, the system, receives data associated with a second requested transaction and applies the retrained fraud detection model to the data associated with the second requested transaction. The retrained fraud detection model, when applied to the received data, may be configured to output a second fraud likelihood score indicating a likelihood that the requested transaction is fraudulent, and the second fraud likelihood score for each requested transaction may be output to an analyst to evaluate the requested transaction. The system can receive a second analyst-generated assessment regarding whether the second requested transaction was fraudulent and retrain the retrained fraud detection model based on the difference between the second fraud likelihood score and the second analyst-generated assessment. For example, the system receives data associated with a second requested transaction such as a requested transaction after a new technique for committing fraud emerges. The data associated with the second requested transaction may be used as input to retrain fraud detection model and the retrained fraud detection model may be again retrained to dynamically adapt applying the changing techniques of fraudsters. By applying the retrained fraud detection model to the data associated with a second requested transaction the system may be able to keep up with the changing techniques of fraudsters. This also allows the fraud detection model to dynamically adapt over time.

In some implementations, the system generates recommended steps to obstruct the requested transaction from completing. For example, the system receives analyst-generated assessments indicating the requested transaction was fraudulent and generate recommended steps to obstruct the requested transaction from completing. The recommended steps can include actions necessary to prevent the requested transaction from occurring, based on the analyst-generated assessments.

Computer System

Figure 6:
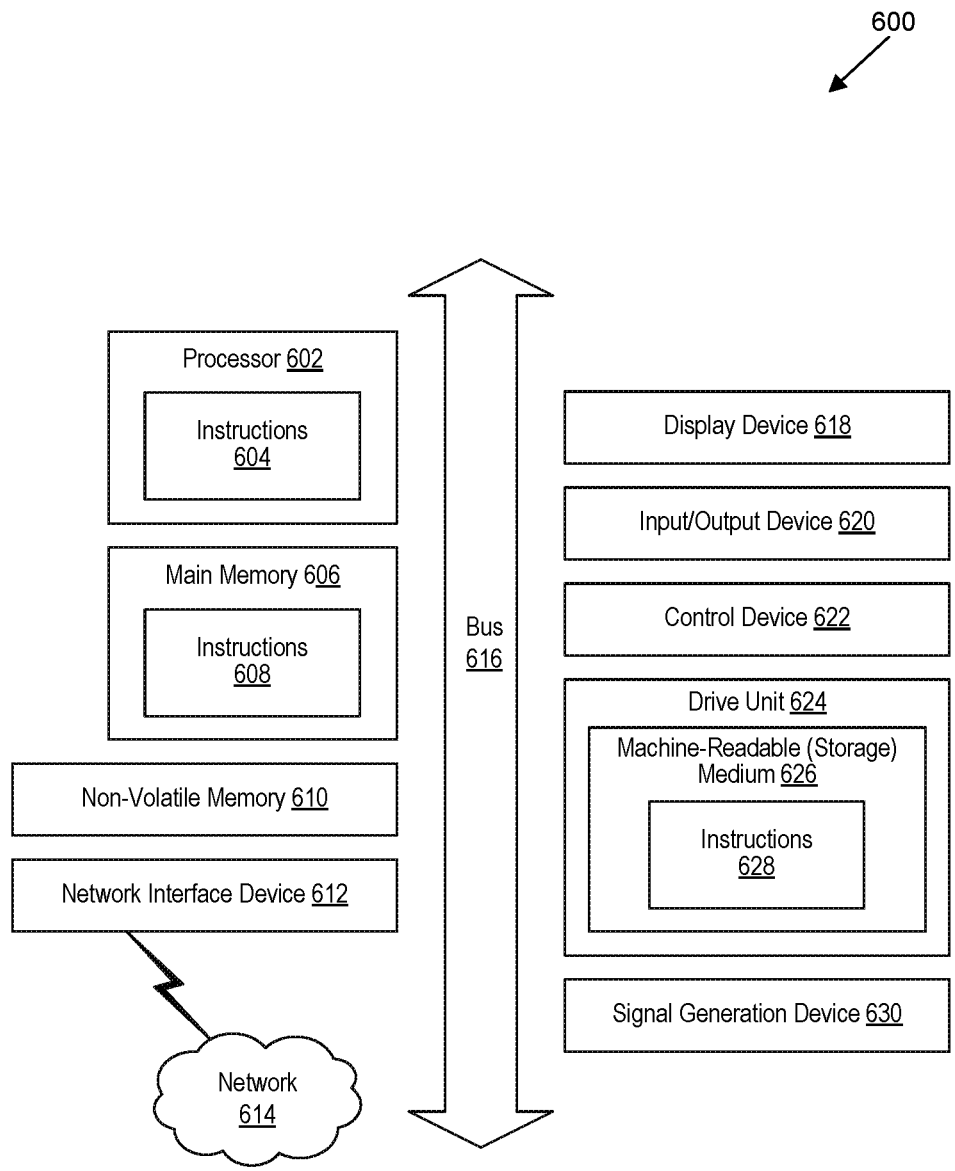
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A system to proactively identify fraudulent transactions, the system comprising:
at least one hardware processor;
a feature-selection module storing instructions, which, when executed by the at least one hardware processor, cause the system to:
receive a set of reports for each of a plurality of historical transactions, the set of reports describing, in natural language, evaluations regarding whether corresponding historical transactions were fraudulent;
identifying one or more feature types that are relevant to the evaluations by applying natural language processing to the set of reports;
a training module storing instructions, which, when executed by the at least one hardware processor, cause the system to:
train a machine learning model using features, from a data stream related to the plurality of historical transactions, that correspond to the one or more feature types;
a fraud-prediction module storing instructions, which, when executed by the at least one hardware processor, cause the system to:
receive data associated with a set of requested transactions;
apply the trained machine learning model to the received data,
wherein the trained machine learning model when applied to the received data is configured to output, for each requested transaction, a fraud likelihood score indicating a likelihood that the requested transaction is fraudulent, and
wherein the fraud likelihood score for each requested transaction is output to an evaluation of the requested transaction;
receive assessments, based on the evaluation of the set of requested transactions, regarding whether each of the requested transactions was fraudulent; and
retrain the trained machine learning model based on a difference between the fraud likelihood scores for the set of requested transactions and the assessments.

2. The system of claim 1, wherein a first assessment of a first requested transaction is received prior to completion of the first requested transaction, and wherein the fraud-prediction module is further configured to cancel the first requested transaction when the first assessment indicates the first requested transaction is fraudulent.

3. The system of claim 1, wherein the assessments further comprise evaluations, in natural language, regarding whether the requested transaction is fraudulent.

4. The system of claim 1, wherein applying the trained machine learning model to the received data further comprises:
inputting the received data into the trained machine learning model; and
outputting the fraud likelihood score indicated the likelihood that the requested transaction is fraudulent.

5. The system of claim 1, further comprising:
receiving data associated with a second requested transaction;
applying the retrained machine learning model to the data associated with the second requested transaction,
wherein the retrained machine learning model, when applied to the received data, is configured to output a second fraud likelihood score indicating a likelihood that the second requested transaction is fraudulent, and
wherein the second fraud likelihood score for each requested transaction is output to an evaluation of the requested transaction;
receiving second assessments regarding whether the second requested transaction was fraudulent; and
retraining the retrained machine learning model based on the difference between the second fraud likelihood score and the second assessments.

6. The system of claim 1, wherein using natural language processing to identify one or more feature types that are relevant to the evaluation further comprises:
determining an extracted tone by performing tone analysis on the evaluation,
wherein the extracted tone comprises a sentiment identified in the assessments; and
identifying a feature type,
wherein the feature type comprises the extracted tone.

7. The system of claim 1, wherein using natural language processing to identify one or more feature types that are relevant to the evaluation further comprises:
determining an extracted topic set by performing topic modeling on the evaluation,
wherein the extracted topic set comprises a cluster of words that frequently co-occur together in reports of fraudulent transactions; and
identifying a feature type,
wherein the feature type comprises the extracted topic set.

8. The system of claim 1, wherein using natural language processing to identify one or more feature types that are relevant to the evaluation further comprises:

determining an extracted entity by performing entity extraction on the evaluation,
wherein the extracted entity comprises data relevant to the requested transaction; and
identifying a feature type,
wherein the feature type comprises the extracted entity.

9. The system of claim 1, wherein receiving the data associated with the requested transaction further comprises:
receiving customer account data,
wherein the customer account data comprises metadata corresponding to a customer; and
receiving a transaction data stream,
wherein the transaction data stream comprises metadata corresponding to the requested transaction.

10. The system of claim 1, further comprising:
receiving assessments indicating the requested transaction was fraudulent; and
generating recommended steps to obstruct the requested transaction from completing,
wherein the recommended steps comprise actions necessary to prevent the requested transaction from occurring, based on the assessments.

11. A method performed by a fraud detection system for training a fraud detection model, the method comprising:
receiving, by at least one hardware processor, transaction data describing a plurality of requested transactions associated with an enterprise;
for each requested transaction:
applying, by the at least one hardware processor, a fraud detection model to the received transaction data corresponding to the requested transaction,
wherein the fraud detection model is trained using features from a data stream related to a first training set of transactions, the features corresponding to a first set of feature types that were identified based on natural language reports regarding whether the transactions in the training set were fraudulent; and
wherein the fraud detection model when applied to the received transaction data is configured to output a first assessment regarding whether the requested transaction is fraudulent; and
receiving, by the at least one hardware processor, a report containing a second assessment regarding whether the requested transaction is fraudulent;
applying, by the at least one hardware processor, natural language processing to the received reports to identify a second set of feature types; and
retraining, by the at least one hardware processor, the fraud detection model using features, corresponding to the second set of feature types, from a data stream related to a second training set of transactions.

12. The method of claim 11, wherein a first assessment of a first requested transaction is received prior to completion of the first requested transaction, and wherein the method further comprises cancelling the first requested transaction when the first assessment indicates the first requested transaction is fraudulent.

13. The method of claim 11, further comprising:
receiving data associated with a second requested transaction;
applying the retrained fraud detection model to the data associated with the second requested transaction,
wherein the retrained fraud detection model, when applied to the received data, is configured to output a second fraud likelihood score indicating a likelihood that the requested transaction is fraudulent, and
wherein the second fraud likelihood score for each requested transaction is output to an evaluation of the requested transaction;
receiving second assessments regarding whether the second requested transaction was fraudulent; and
retraining the retrained fraud detection model based on a difference between the second fraud likelihood score and the second assessments.

14. The method of claim 11, wherein receiving the data associated with the requested transaction further comprises:
receiving customer account data,
wherein the customer account data comprises metadata corresponding to a customer; and
receiving a transaction data stream,
wherein the transaction data stream comprises metadata corresponding to the requested transaction.

15. The method of claim 11, further comprising:
receiving assessments indicating the requested transaction was fraudulent; and
generating recommended steps to obstruct the requested transaction from completing,
wherein the recommended steps comprise actions necessary to prevent the requested transaction from occurring, based on the assessments.

16. A non-transitory computer-readable storage medium storing computing program instructions, execution of which by one or more processors causes the one or more processors to:
receive, by a fraud detection system, transaction data describing a plurality of requested transactions associated with an enterprise;
for each requested transaction:
apply, by the fraud detection system, a fraud detection model to the received transaction data corresponding to the requested transaction,
wherein the fraud detection model is trained using features from a data stream related to a first training set of transactions, the features corresponding to a first set of feature types that were identified based on natural language reports regarding whether the transactions in the training set were fraudulent; and
wherein the fraud detection model when applied to the received transaction data is configured to output a first assessment regarding whether the requested transaction is fraudulent; and
receive a report containing a second assessment regarding whether the requested transaction is fraudulent;
apply, by the fraud detection system, natural language processing to the received reports to identify a second set of feature types; and
retrain, by the fraud detection system, the fraud detection model using features, corresponding to the second set of feature types, from a data stream related to a second training set of transactions.

17. The non-transitory computer-readable storage medium of claim 16, wherein a first assessment of a first requested transaction is received prior to completion of the first requested transaction, and wherein the instructions further cause the one or more processors to cancel the first requested transaction when the first assessment indicates the first requested transaction is fraudulent.

18. The non-transitory computer-readable storage medium of claim 16, wherein the execution of the computing program instructions by the one or more processors further causes the one or more processors to:

receive data associated with a second requested transaction;

apply the retrained fraud detection model to the data associated with the second requested transaction,
- wherein the retrained fraud detection model, when applied to the received data, is configured to output a second fraud likelihood score indicating a likelihood that the requested transaction is fraudulent, and
- wherein the second fraud likelihood score for each requested transaction is output to an evaluation of the requested transaction;

receive second assessments regarding whether the second requested transaction was fraudulent; and retrain the retrained fraud detection model based on a difference between the second fraud likelihood score and the second assessments.

19. The non-transitory computer-readable storage medium of claim 16, wherein receiving the data associated with the requested transaction further comprises:

receiving customer account data,
- wherein the customer account data comprises metadata corresponding to a customer; and receiving a transaction data stream,
- wherein the transaction data stream comprises metadata corresponding to the requested transaction.

20. The non-transitory computer-readable storage medium of claim 16, wherein the execution of the computing program instructions by the one or more processors further causes the one or more processors to:

receive assessments indicating the requested transaction was fraudulent; and generate recommended steps to obstruct the requested transaction from completing,
- wherein the recommended steps comprise actions necessary to prevent the requested transaction from occurring, based on the assessments.

* * * * *